3,071,553
PHOSPHINOBORINE COMPOUNDS AND THEIR PREPARATION

Anton B. Burg, Los Angeles, and Ross I. Wagner, Whittier, Calif., assignors, by mesne assignments, to American Potash & Chemical Corporation, a corporation of Delaware
No Drawing. Filed Mar. 30, 1959, Ser. No. 802,615
36 Claims. (Cl. 260—2)

This application is a continuation-in-part of co-pending application Serial No. 446,147 filed July 27, 1954, and now abandoned.

This invention relates in general to the preparation of heat stable and chemically resistant polymers and more particularly to preparation of high-polymers formed of bonded phosphorus and boron atoms displaying the properties above-named.

Basically inorganic polymers have been sought for their expected chemical and thermal stability. Basically inorganic polymers which are resilient and may be used in certain specialized applications, for example, fuel or lubricant lines in places where considerable heat resistance is necessary as well as ability to resist the effects of highly corrosive fuels and other fluids, are particularly desirable. Metal and other rigid materials are not satisfactory in these applications because of fatigue.

It is therefore an object of this invention to provide for the preparation of basically inorganic polymers containing phosphorus and boron.

It is a further object of this invention to provide for the preparation of linear phosphinoborine polymers having unusual chemical and thermal stability.

Further objects and advantages of this invention, if not specifically set forth, will become apparent in the course of the detailed description which follows.

Generally, it has been found that phosphinoborines of the general formula $(R'R''PBH_2)_nY$ where $n$ is an integer of 3–1000, $R'$ and $R''$ represent hydrocarbon radicals, Y represents a secondary or tertiary amine ($R_2NR'''$, where R is lower alkyl and $R'''$ is H, lower alkyl or phenyl), a secondary or tertiary phosphine ($R_2PR'''$, where R and $R'''$ are as just mentioned), a poly-functional secondary or tertiary amine or phosphine, such as triethylenediamine or triethylenediphosphine. Also, Y may be piperidine, N-methylpiperidine, pyridine or tetramethylguanidine and the term "amine" as used hereinafter is intended to include such compounds. These new linear polymers may be prepared by pyrolyzing a phosphine borine of the general formula $R'R''HP:BH_3$ in the presence of one of the aforementioned bases. Phosphine borines which may be used are those set forth in U.S. Patents 2,916,518 and 2,916,194 and Serial No. 666,208, filed June 17, 1957, for Phosphine Borine Compounds and Their Preparation. Other phosphine borines, such as dimethylphosphine borine, are well known and the preparation thereof is set forth in the literature.

More particularly, a phosphinoborine may be formed which is a linear chain of repeated tetracoordinate $R'R''PBH_2$ units wherein the linearity arises by successive additions of phosphinoborine monomer units to an end group consisting originally of a Y-phosphinoborine monomer complex. The process is illustrated below for the pyrolysis of dimethylphosphine borine in the presence of triethylamine:

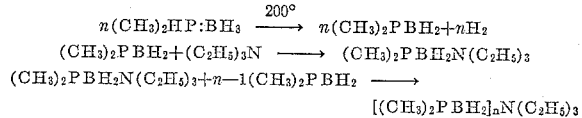

The end group complex renders cyclization to trimer and tetramer less favorable and to obtain the same rate of hydrogen elimination from dimethylphosphine borine requires a higher temperature (200° C.) in the presence of a Y compound than when alone (150° C.).

The secondary phosphine which forms a part of the phosphine borine competes for the $BH_3$ with the intended end group (Y), so that the molecular species present in a pyrolyzing reaction mixture are as shown in the following equation, where the symbols $R'$ and $R''$ are selected from the class consisting of (a) two separate radicals selected from the class consisting of alkyl groups having less than 13 carbon atoms, lower alkenyl and phenyl and (b) a single polymethylene radical bonded at either end thereof to the P, and the specific $R_2R'''N$ is substituted for the generic Y:

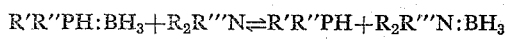

If this general equation is considered together with the three listed immediately above, it will be seen that the polymer end group will be a mixture of both the material introduced as the intended end group and the secondary phosphine which forms a part of the phosphine borine.

Obviously, because of the equilibrium equation described above, it is also possible to introduce the reactants as $R_2R'''N:BH_3$ and $R'R''PH$ or as Y, $R'R''PH$ and $B_2H_6$, as well as in the preferred fashion described. Any of these three approaches yields what can be considered initially an admixture of Y, $B_2H_6$ and $R'R''PH$, the latter two forming the phosphine borine, which in turn polymerizes during pyrolysis until polymerization is complete or stopped by cyclization of the growing polymer chain.

Obviously, co-polymers can be prepared from mixtures of different phosphine groups. This may be accomplished by using two or more phosphines in admixture with $B_2H_6$ and in intended end grouping material or, alternatively, mixtures of two or more preformed phosphine borines can be formed and thereafter contacted with the end group material.

The equations representing the preparation of the linear polymer may be simplified as follows, the formula illustrating the pyrolysis, as above, of dimethylphosphine borine in the presence of triethylamine:

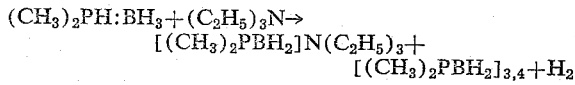

The reaction is carried out at temperatures between about 130° C. and 250° C. and may be carried out in the absence of a solvent for the materials being pyrolyzed. The ratio of the amine or phosphine to the phosphine borine preferably is within the range of .1:1 and 1:1 and may under certain circumstances range from .01–10 to 1. For a given end group, a lower ratio results in greater proportions of cyclic by-product and a higher ratio results in lower molecular weight polymers.

Preferred phosphines or amines are trimethylamine, triethylamine, tributylamine, dimethylphosphine and the difunctional amines, N,N,N',N'-tetraethylethylenediamine and N,N,N',N'-tetramethylethylenediamine. The pyrolysis must be carried out over the aforementioned temperature range of 130° C. to 250° C. for a period of between 10 and 60 hours for optimum results to be obtained.

Inert solvents which might be used in the reaction are benzene, cyclohexane, tetralin and decalin. At very high adduct-to-end group ratios, the end group acts as a non-inert solvent.

In the examples which follow, the use of high vacuum is for convenience only and no particular significance should be associated with it and the successful preparation of polymers. In one of the examples related below, the reaction was conducted under an inert nitrogen atmosphere. The experiments which were most successful were conducted under pressure to contain the reagents, and experiments at atmospheric pressure were less successful, since one or more of the reactants were allowed to escape from the reaction zone when pressure was absent. If all reagents are insufficiently volatile to escape the reaction zone at the reaction temperature, atmospheric pressure is suitable.

In the experiments reported below using difunctional tertiary amines as end groups, the degree of polymerization obtained was found to be about twice that secured where triethylamine was used as the end group. This doubling of the molecular weight indicates that the difunctional amine simply binds into a single molecule two polymer chains each of a molecular weight comparable to the chains obtained using triethylamine. Chemically speaking, therefore, the diamine or diphosphine functions in very much the same manner as the ordinary secondary or tertiary amine or phosphine.

The practice of this invention, both with respect to performing the process and securing the product thereof, will become apparent from the following examples which are set forth by way of illustration.

In the various examples below, all measurements of gas are corrected to STP. It will be noted that in certain places in the examples, various quantities measured in cubic centimeters (cc.) appear. It is common in high vacuum work to refer any given quantity of material, whether solid or otherwise, to an equivalent volume of gas at standard temperature and pressure. Given a quantity in mmoles, the cc. volume may be ascertained by multiplying this number by 22.4.

EXAMPLE I

Condensed successively into a 40 ml. tube were 163.3 cc. dimethylphosphine, 82.3 cc. diborane and 29.2 cc. tri-n-butylamine. The tube was sealed and heated in an oven at 200°±15° for 17 hours. At the end of this time, the evolved hydrogen was measured and amounted to 165.4 cc. (101.3%). The yield of linear polymer was 0.2400 g. (72.8 cc., calcd. as monomeric $(CH_3)_2PBH_2$, 44.6%). The melting point was 164–168° C. (corr.). The yield of trimer and tetramer was not determined because of admixture with tri-n-butylamine.

EXAMPLE II

A methylethylphosphinoborine linear polymer was prepared in the manner described in greater detail in Example V below re the corresponding dimethyl derivative. A quantity of 163.1 cc. methylethylphosphine, 81.3 cc. diborane and 33.4 cc. triethylamine were used. The products obtained were 162.6 cc. (100.0%) hydrogen, 0.3551 g. (90.5 cc., calc. as monomeric $CH_3(C_2H)PBH_2$, 55.7%) liquid volatile at 195° in high vacuum and 0.2740 g. (69.9 cc., calc. as monomeric $CH_3(C_2H_5)PBH_2$, 43.0%) of colorless translucent polymer, M.P. 118–126° (corr.) which analyzed C, 41.15; H, 11.51; calc. for $C_3H_{10}PB$: C, 40.98; H, 11.46 The molecular weight was determined by the isopiestic method to be 1836 corresponding to a D.P. (degree of polymerization) of 19.7 assuming one triethylamine per mole. The volatile liquid had $n_D^{20}$ 1.5271, which corresponds to impure methylethylphosphinoborine trimer ($n_D^{20}$ 1.5255).

This polymer, although fairly low melting, has interesting plastic properties and is quite soluble in benzene.

EXAMPLE III

Methylethylphosphine borine was mixed with methylphosphine borine in a ratio of 4:1, and pyrolyzed in the presence of triethylamine, to give a yield of 13.1% of polymer. The quantities of reactants were 138.9 cc. methylethylphosphine, 32.7 cc. methylphosphine, 84.6 cc. diborane, and 35.0 cc. triethylamine. The products obtained were 186.7 cc. (92.5%) hydrogen, 0.4220 g. (66.8%) of a cloudy liquid volatile at 200° in high vacuum, and 0.0830 g. (13.1%) of a cloudy, tacky semi-solid. The tacky, cloudy, semi-solid, partially-ethylated product was not volatile at 200° C. in a high vacuum.

EXAMPLE IV

Dimethylphosphine borine was mixed with methyl phosphine borine in a ratio of 9:1 and pyrolyzed in the presence of triethylamine, to give a 27.6% yield of the linear polymer. The experimental procedure was the same as described for the preparation of dimethylphosphinoborine linear polymer in Example V below. The quantities of reactants were 145.5 cc. dimethylphosphine, 18.9 cc. methylphosphine, 82.4 cc. diborane, and 38.9 cc. triethylamine. The products obtained were 175.5 cc. (85.5%) hydrogen, 0.3407 g. (64.3%) of semi-solid material volatile at 210° under high vacuum, 0.0280 g. (5.3%) of tacky, colorless liquid also volatile at 210° and 0.1466 g. (27.6%) of a brittle, translucent glass, non-volatile at 210°.

EXAMPLE V

A series of additional runs was made which was designed to test the effect of temperature, heating time, nature and quantity of chain-end blocking groups, presence of stainless steel, a large glass surface, and added linear polymer on the yield of linear polymer. Inspection of Table A below reveals that the reaction temperature and nature of the chain-end blocking group most influence the yield of linear polymer. The startling decrease of linear polymer yield at 238°–248° C. (runs 10-12) indicates that trimeric and tetrameric product is thermodynamically more stable than linear polymer, or that the activation energy for polymer formation is lower than for trimer and tetramer. The rates of formation of the products at 200° C. would appear from the yield data to be roughly equal. The degree of polymerization (D.P.) of the combined linear polymers, formed in runs 1, 2 and 3, was determined by the aforementioned isopiestic method to be 43.5. This method is generally regarded as accurate within about 5%.

Triethylamine as the chain-end blocking group is seen to be the best material for this purpose—it is the most basic group used in the test set forth in the table below. In general, the yield of polymer is seen to increase as the basicity of the chain-end blocking group increases, with the one exception of run 16, using trimethylphosphine. It may be that in this test, the basicity was overshadowed by steric factors, since dimethylphosphine is less basic (toward H+) than trimethylphosphine.

Runs 1-9 and 16 were done in 80 ml. tubes and the others were done in 40 ml. tubes. The same techniques were used for all runs and, therefore, only Experiment 13 will be described in detail.

Condensed successively into a 40 ml. tube were 144.2 cc. of dimethylphosphine, 71.4 cc. of diborane and 16.2 cc. of triethylamine. The tube was sealed and heated in an oven at 200°±15° for 17 hours. At the end of this time, the evolved hydrogen was measured and amounted to 138.2 cc. (96.8%). Solid trimeric and tetrameric materials were sublimed from the tube at about 160°±50° under high vacuum and weighed 0.2364 g. (71.7 cc. as monomeric $(CH_3)_2PBH_2$, 50.2%). This volatile material was not further characterized. The non-volatile residue was removed from the reaction tube in solution in three 5 ml. portions of refluxing benzene. The solutions were combined and gelled upon cooling. The benzene was mostly removed in a stream of argon and the last traces were removed under high vacuum. The polymer thus obtained weighed 0.2093 g. (63.5 cc. as monomeric $(CH_3)_2PBH_2$, 44.5%) and was a white amorphous powder having M.P. 163.6–167.5° (corr., under nitrogen). The infrared spectrum was obtained (KBr disc) and was similar to that of dimethylphosphinoborine trimer. Combustion analysis of the polymer showed C, 33.78; H, 11.61; (calc. for $C_2H_8PB$: C, 32.51; H, 10.94).

In experiments 2 and 3, 15.7 mg. (4.7 cc.) and 23.1 mg. (6.9 cc.), respectively, of the polymer obtained from experiment 1 were weighed into the tubes before introduction of the other reagents. In experiment 17, 280 mg. of stainless steel filings were placed in the tube and in experiment 19, the tube was packed with Pyrex glass wool prior to introduction of the reactants.

trimer. The amine borine was identified by boiling point and comparison of the infrared spectrum with that of an authentic sample.

EXAMPLE VII

In this run, the procedure used was the same as that described in Example V above. A quantity of 106.7 cc. of dimethylphosphine, 53.6 cc. of diborane and 111.8 cc. of triethylamine reacted to yield 100.6% of the theoretical hydrogen and 0.1952 g. (55.5%) of polymer, M.P. 160–166° C. (corr.). The ratio of triethylamine to phosphine borine was thus 1:1 on a molar basis, and the melting

*Table A*

RESULTS OF DIMETHYLPHOSPHINE BORINE PYROLYSIS EXPERIMENTS WITH CHAIN-END BLOCKING AGENTS

| Run | $(CH_3)_2PHBH_3$ used, cc. (gas STP) | Chain-end blocking group, cc. (gas STP) | $(CH_3)_2PHBH_3$: blocking group, mole ratio | Reaction time, hrs. | Reaction temp., ° C. | Percent yield products | | | Polymer M.P. (corr.), ° C. |
|---|---|---|---|---|---|---|---|---|---|
| | | | | | | $H_2$ | Trimer and tetramer | Polymer | |
| 1 | 324.0 | $(CH_3)_2PH$, 342.4 | 1:1.1 | 63, 35 | 150, 180 | 100.9 | 67.5 | 33.3 | 159.4–161.4 |
| 2 a | 326.4 | $(CH_3)_2PH$, 320.4 | 1:1 | 17 | 180 | (c) | 79.7 | d Ca.0.1 | 161.2–171.4 |
| 3 b | 325.3 | None | 1:0 | 17 | 180 | 96.4 | 87.4 | 8.3 | 163.4–166.4 |
| 4 | 290.4 | $(CH_3)_2PH$, 579.3 | 1:2 | 17.5 | 200 | 106.0 | 78.0 | 20.4 | 176.3–180.3 |
| 5 | 318.8 | $(CH_3)_2PH$, 267.4 / $(CH_3)_3N$, 0.8 | 1:0.8:trace | 20 | 200 | 99.2 | 71.9 | 25.4 | 167.4–168.4 |
| 6 | 293.2 | $(CH_3)_2PH$, 26.8 | 1:0.1 | 18 | 200 | 98.7 | 62.9 | 31.6 | 163.4–165.4 |
| 7 | 290.4 | $(CH_3)_3N$, 149.8 | 1:0.5 | 36 | 200 | (c) | 60.6 | 35.7 | 167.4–168.4 |
| 8 | 226.0 | $(CH_3)_3N$, 217.5 | 1:1 | 40 | 200 | 96.5 | 72.9 | 22.8 | 163.9–167.4 |
| 9 | 228.6 | $(C_2H_5)_3N$, 222.1 | 1:1 | 44 | 200 | 99.6 | 57.9 | 39.0 | 155.9–161.4 |
| 10 | 133.1 | None | 1:0 | 16.5 | 238 | 98.0 | 98.8 | e 1.2 | |
| 11 | 129.8 | $(CH_3)_2PH$, 17.4 | 1:0.1 | 16.5 | 237 | 99.2 | 96.6 | e 3.4 | |
| 12 | 113.8 | $(CH_3)_2PH$, 105.2 | 1:0.9 | 16.5 | 248 | 99.5 | 97.6 | e 2.4 | |
| 13 | 142.8 | $(C_2H_5)_3N$, 16.2 | 1:0.1 | 17 | 200 | 96.8 | 50.2 | 44.5 | 163.4–167.5 |
| 14 | 147.0 | $(CH_3)_3N$, 14.0 | 1:0.1 | 21 | 200 | 96.1 | 63.4 | 33.4 | 163.4–166.4 |
| 15 | 144.3 | $(CH_3)_2NH$, 6.3 | 1:0.04 | 21 | 200 | (c) | 74.9 | 21.4 | 164.4–165.4 |
| 16 | 260.6 | $(CH_3)_3P$, 54.0 | 1:0.34 | 35 | 200 | 102.4 | 88.5 | 9.2 | 148.4–155.4 |
| 17 f | 138.0 | $(C_2H_5)_3N$, 10.9 | 1:0.08 | 20 | 200 | (c) | 54.6 | 39.8 | 155.4–167.4 |
| 18 | 152.5 | $(C_2H_5)_3N$, 23.3 | 1:0.15 | 23 | 200 | 96.3 | 56.0 | 42.8 | 163.9–165.9 |
| 19 g | 148.8 | $(C_2H_5)_3N$, 16.9 | 1:0.1 | 23 | 200 | 97.0 | 65.5 | 27.7 | 160.4–163.4 |
| 20 | 154.2 | $(C_2H_5)_3N$, 19.0 | 1:0.12 | 14 | 200 | 95.8 | 67.5 | 30.8 | 155.4–159.9 |
| 21 | 152.8 | $(C_2H_5)_3N$, 2.9 | 1:0.02 | 22 | 200 | 95.7 | 50.2 | 47.0 | 159.8–164.9 |
| 22 | 154.7 | $(C_2H_5)_3N$, 20.8 | 1:0.13 | 17 | 200 | 96.1 | 58.1 | 38.6 | 156.4–159.4 | a 4.7 cc. of polymer from run 1 added.
b 6.9 cc. of polymer from run 1 added.
c Not measured.
d Reaction not carried to completion.
e By difference, polymer not isolated.
f 280 mg. of stainless steel filings added to reaction tube.
g Reaction tube packed with glass wool.

EXAMPLE VI

In a large scale preparation of dimethylphosphinoborine linear polymer, a mixture of dimethylphosphine borine, prepared from 59.2 g. (0.95 mole) dimethylphosphine treated with excess diborane and 42 g. (0.41 mole) triethylamine cooled to about −78° and contained in an open glass vessel, was sealed under an atmosphere of nitrogen in a 1-liter stainless steel bomb. The bomb was heated at 200±15° for 29 hours after which the bomb was cooled, opened, and 19.5 liters (91.5%) hydrogen was collected. The white solid in the glass vessel was slurried with 1-liter of ether and filtered. The solid was refluxed with 700 ml. ether and again filtered. The filter cake was dissolved in hot benzene and the solution was filtered. The benzene filtrate was cooled and the precipitate collected. The precipitate was recrystallized once more from benzene and yielded 34.3 g. (49.0%) of linear polymer, M.P. 170°–172° (corr.) analyzing C, 31.82; H, 10.70; calc. for $C_2H_8PB$: C, 32.51; H, 10.91. The molecular weight was determined isopiestically in benzene solution to be 6014 corresponding to a D.P. of 80 assuming one triethylamine per mole.

Another 3.1 g. of polymer was obtained upon evaporation of the benzene mother liquors making the total yield of polymer 53.3%.

The ether extracts were combined and the ether removed by distillation. Fractional sublimation under high vacuum at 60° yielded 21.79 g. (31.0%) of dimethylphosphinoborine trimer, 2.52 g. (3.6%) of tetramer, and about 1.5 g. of triethylamine borine admixed with point may indicate a lower molecular weight than the products previously prepared having a smaller amine to phosphine borine ratio.

EXAMPLE VIII

In another preparation carried out in a fashion similar to Example VII, 158.2 cc. of dimethylphosphine, 78.2 cc. of diborane and 37.5 cc. of N,N,N′,N′-tetraethylethylenediamine, yielded 97.6% of the theoretical hydrogen and 0.2976 g. (57.7%) of polymer, M.P. 169–172° C. (corr.). The molecular weight of the dimethylphosphinoborine linear polymer formed in the presence of N,N,N′,N′-tetraethylethylenediamine was determined by the isopiestic method to be 13,632 (D.P. 183 P-B units).

EXAMPLE IX

In another preparation carried out in the fashion described in Examples VII and VIII above, 166.4 cc. of dimethylphosphine, 83.3 cc. of diborane and 58.3 cc. of N,N,N′,N′-tetramethylethylenediamine, yielded 101.3% of the theoretical hydrogen and 0.2300 g. (41.9%) of polymer, M.P. 158.5–160.5° C. (corr.).

The runs described in Examples VIII and IX above using N,N,N′,N′-tetraethylethylenediamine and N,N,N′,N′-tetramethylethylenediamine were both made as part of an effort to build polymer chains on both ends of the diamine.

EXAMPLE X

Condensed successively into a 40 ml. bomb tube containing 112 cc. of triethylamine were 158.5 cc. of diethylphosphine and 78.0 cc. of diborane. The tube was sealed and heated at 200±15° for 21 hours after which time 100.4% of the theoretical amount of hydrogen was obtained. The volatile material was sublimed in high vacuum using a luminous flame as heat source. The volatile material weighed 1.0011 g. The residual polymer weighing 0.1187 g. (16.7%) was not soluble in hot benzene and was removed mechanically from the tube. It is a brittle, translucent white material, M.P. 263–267° (corr.) analyzing C, 48.04; H, 12.15. (Calc. for $C_4H_{12}PB$: C, 47.11; H, 11.87).

EXAMPLE XI

Condensed successively into a 40 ml. bomb tube containing 112 cc. of triethylamine were 142.8 cc. of methylallylphosphine and 70.8 cc. of $B_2H_6$. The tube was sealed and heated at 200±15° for 21 hours. The tube was opened and a small amount of the hydrogen evolved was accidentally lost; nevertheless, 97.0% of the theoretical amount was found. The volatile material was sublimed in high vacuum to leave a non-volatile residue. The residue was extracted with benzene, leaving 0.0275 g. (4.3%) insoluble residue, M.P. 140–170°, which analyzed C, 46.09; H, 9.87. (Calc. for $C_4H_{10}PB$: C, 48.08; H, 10.09). The solvent was evaporated from the benzene extract to yield 0.5023 g. (78.8%) of a foamy, clear, extremely brittle solid, M.P. 76–78° (corr.), which analyzed C, 48.82; H, 10.17. (Calc. for $C_4H_{10}PB$: C, 48.08; H, 10.09.)

In the next five experiments reported, the general procedure described in the next paragraph was followed in preparing the linear phosphinoborines.

Triethylamine was introduced into a nitrogen-filled 40 ml. bomb tube from a 2 ml. burette; next, a secondary phosphine was introduced into the tube either as a weighed amount of liquid or a measured volume of vapor; last, an amount of diborane sufficient to convert the phosphine to the phosphine borine was introduced on the high vacuum line and the tube was sealed. The tubes were heated at 200±15° for 22±1 hours, cooled, and opened. The evolved hydrogen was collected and measured. Each tube was then subjected to vacuum sublimation at 180±5° for 10–20 minutes (with a 40 minute warming period starting at 90–130°). The non-volatile residues were removed from the tube mechanically or with the aid of a solvent and characterized as described below for each experiment. The amine-containing sublimates were not weighed or characterized but were assumed to consist principally of trimeric and tetrameric phosphinoborines.

EXAMPLE XII

Pyrolysis of 128 cc. of triethylamine, 150.8 cc. of methyl-n-propylphosphine and 82.0 cc. of diborane (11% excess) yielded 161.7 cc. (107.2%) of hydrogen. After sublimation the non-volatile product was removed from the tube in ether solution. A small amount of insoluble material (7.5 mg., M.P. ca. 205–209°) was removed by centrifugation and the resulting ether solution was evaporated to yield 0.3800 g. (55.4%) of an extremely viscous, slightly cloudy, colorless liquid, the infrared spectrum of which was very similar to that of methylethylphosphinoborine linear polymer. The molecular weight was determined isopiestically in benzene solution to be 1062, corresponding to a D.P. of 10.4.

EXAMPLE XIII

Pyrolysis of 128 cc. triethylamine, 142.7 cc. of methyl-i-propylphosphine and an excess of diborane yielded 161.0 cc. (112.8%) of hydrogen. The exact amount of diborane used was not determined. That an excess was used was deduced from the amount of hydrogen obtained. Almost all of the tube contents sublimed. The residue consisted of a solid and a liquid which was separated from the solid by dissolution in ether. The ether was evaporated to yield 17.7 mg. (2.7%) of a clear, extremely viscous liquid which had an infrared spectrum (carbon disulfide solution) very similar to methylethylphosphinoborine linear polymer. The solid remaining in the tube was removed mechanically and amounted to 17.6 mg. (2.7%). The infrared spectrum of this solid was ill-defined but showed very weak B–H and C–H stretching absorptions. Insufficient material prevented further characterization.

EXAMPLE XIV

Pyrolysis of 96.2 cc. of triethylamine, 99.7 cc. of cyclotetramethylenephosphine and 50.0 cc. of diborane in a 20 ml. bomb tube yielded 98.0 cc. (98.3%) of hydrogen. Almost all of the tube contents sublimed giving a solid which was insoluble in cold methanol. The residue was partially soluble in ether and 21.3 mg. (4.8%) of a clear glass was isolated upon evaporation of the solvent. The ether insoluble residue was removed mechanically from the tube with the aid of benzene and yielded 15.0 mg. (3.4%) of a tacky semi-solid upon evaporation of the benzene. The infrared spectra of both the ether soluble and insoluble materials were virtually identical and very similar to the infrared spectrum of methylethylphosphinoborine linear polymer.

EXAMPLE XV

Pyrolysis of 26.9 cc. of triethylamine, 60.4 cc. of methyldodecylphosphine and 30.7 cc. of diborane yielded 56.3 cc. (93.5%) of hydrogen. After sublimation of 0.169 g. of volatile material the liquid residue was removed from the tube with benzene with which it appeared to be miscible at room temperature. The benzene was evaporated to leave a cloudy, viscous liquid which weighed 0.543 g. (83.4%), had $n_D^{22.5}$ 1.4926 after centrifugation to remove cloudiness and analyzed: C, 69.25; H, 12.86 (calcd. for $C_{13}H_{30}PB$: C, 68.43; H, 13.25). The molecular weight was determined to be 870 (D.P. 3.8) by the isopiestic method. An infrared spectrum of the liquid was obtained.

EXAMPLE XVI

Pyrolysis of 87.5 cc. of triethylamine, 97.9 cc. of methylphenylphosphine and 48.9 cc. of diborane yielded 88.6 cc. (90.5%) of hydrogen after 23 hours and another 5.4 cc. (5.5%) upon further heating for 16 hours. The product was removed from the tube in ether solution. A small amount of insoluble material (4.6 mg., M.P. 183–195°) was removed by centrifugation and the resulting clear ether solution was evaporated to yield 0.5494 g. (92.4%) of a viscous oil which shows the presence of B–H, phenyl and methyl groups in the infrared spectrum. The molecular weight of the product was determined to be 787 (D.P. 5.8) by the isoplastic method.

EXAMPLE XVII

Into a 40 ml. bomb tube containing 14.4 cc. of methyldodecylphosphine and 128 cc. of triethylamine were condensed successively 152.6 cc. of dimethylphosphine and 82.6 cc. of diborane. The tube was sealed and heated at 200±15° for 22 hours. The hydrogen evolved amounted to 166.9 cc. (99.9%). The contents of the tube were subjected to vacuum sublimation (200° maximum temperature) and yielded 0.704 g. of volatile material. The non-volatile residue was removed from the tube with the aid of hot benzene and the benzene was evaporated to leave 0.2621 g. (40.4%) of a waxy, translucent solid, M.P. 122–125° which analyzed C, 43.91; H, 12.27 (calcd. based on proportions of starting phosphines: C, 40.61; H, 11.44). An infrared spectrum (KBr disc.) of the product was very similar to that of dimethylphosphinoborine linear polymer.

EXAMPLE XVIII

This experiment was done as described for the above copyrolysis using 128 cc. of triethylamine, 6.5 cc. of methylallylphosphine, 159.6 cc. of methylethylphosphine and 84.2 cc. of diborane as reactants. The hydrogen evolved amounted to 167.8 cc. (101.0%). The contents of the tube were subjected to vacuum sublimation at 180±5° for 20 minutes, during which air accidentally entered the tube but did not appear to cause oxidation. The non-volatile material was removed from the tube with the aid of benzene and the solvent was evaporated to leave 0.4662 g. (71.1%) of translucent material M.P. ca. 77–85°.

In the experiment reported below, an attempt was made by means of heat to induce chain lengthening of a dimethylphosphinoborine linear polymer.

EXAMPLE XIX

About 0.2 g. of dimethylphosphinoborine linear polymer (molecular weight 6014, M.P. 170–172°) was heated for about 15 minutes in high vacuum with a luminous flame such that the polymer was kept just molten. About 85% of the polymer remained non-volatile and this residue was recrystallized from benzene to give polymer of M.P. 170–172°. The molecular weight was found to be 6524 by the isopiestic method.

EXAMPLE XX

In this experiment, a biphosphine monoadduct, $P_2(CH_3)_4BH_3$, was prepared by the reaction between 0.960 mole of $P_2(CH_3)_4$ and 0.480 mole of $B_2H_6$ during a 10 hour warming from —60° to —8° C. About 16% of the $P_2(CH_3)_4$ was left unused. This would mean that a further 16% of the $P_2(CH_3)_4$ had been converted to the diadduct, $P_2(CH_3)_4(BH_3)_2$. There was little adsorption of the free $P_2(CH_3)_4$ even after twenty minutes at 100° C., meaning that the diphosphine does not easily remove a $BH_3$ group from the diadduct to form the monoadduct, $P_2(CH_3)_4BH_3$. The three stages of the experiment appear in Table B below and it may be seen that the excess diphosphine was almost all absorbed at the third stage. Since the trimer and tetramer forms of $(CH_3)_2PBH_2$ accounted for only 43% of expectations, it appears that the remaining $(CH_3)_2PBH_2$ units were present in a high polymer, one end of which was blocked by the phosphorus compound such as $(CH_3)_2PH$. The mechanism may be thought of as a decomposition of the monoadduct according to the equation:

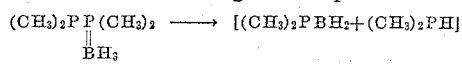

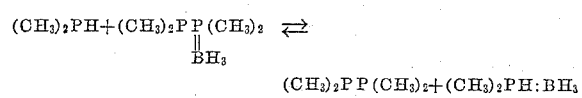

The phosphine borine thus formed reacts with the phosphine according to the equation:

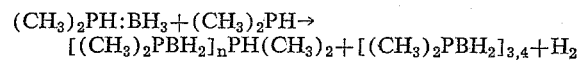

where high temperatures and opportunities for chemical reaction (such as hydrolysis) are prevalent. Where the products obtained by following the teachings of this invention are liquids throughout the temperature range whereat they are to be used, they are valuable as chemically and thermally stable hydraulic fluids.

Obviously, many modifications and variations of the invention may be made without departing from the spirit and scope thereof, and therefore only such limitations should be imposed as are indicated in the appended claims.

We claim:

1. A linear phosphinoborine polymer consisting essentially of a plurality of monomeric units, each of said units having the general formula $(R'R''PBH_2)$, each of said units being linked to adjacent monomeric units by means of phosphorus-to-boron bonds, one of said monomeric units of said polymer having at least one group as a part thereof selected from the class consisting of secondary amines, tertiary amines, secondary phosphines, tertiary phosphines, poly-functional secondary amines, poly-functional tertiary amines, poly-functional secondary phosphines and poly-functional tertiary phosphines, each of said amines and phosphines containing only carbon and hydrogen in addition to the nitrogen and phosphorus atoms thereof, the symbols R' and R'' being selected from the class consisting of (a) two separate radicals selected from the class consisting of alkyl groups having less than 13 carbon atoms, lower alkenyl and phenyl and (b) a single polymethylene radical bonded at either end thereof to the P.

2. A linear phosphinoborine polymer of the general formula $(R'R''PBH_2)_nY$ wherein R' and R'' are selected from the class consisting of (a) two separate radicals selected from the class consisting of alkyl groups having less than 13 carbon atoms, lower alkenyl and phenyl and (b) a single polymethylene radical bonded at either end thereof to the P, Y represents a member of the class consisting of secondary amines, tertiary amines, secondary phosphines, tertiary phosphines, poly-functional secondary amines, poly-functional tertiary amines, poly-functional secondary phosphines and poly-functional tertiary phosphines, each of said amines and phosphines containing only carbon and hydrogen in addition to the nitrogen and phosphorus atoms thereof, and n is an integer indicative of the degree of polymerization.

3. The structure of claim 2 wherein R' and R'' are methyl.

4. The structure of claim 2 wherein R' is methyl and R'' is ethyl.

5. The structure of claim 2 wherein R' and R'' are ethyl.

6. The structure of claim 2 wherein R' is methyl and R'' is propyl.

7. The structure of claim 2 wherein R' is methyl and R'' is dodecyl.

8. The structure of claim 2 wherein R' is methyl and R'' is phenyl.

*Table B*

REACTION BETWEEN 0.960 MMOLE OF $P_2(CH_3)_4$ AND 0.480 MMOLE OF $B_2H_6$

| Stage | Heat treatment | Volatile components (total mmoles) | | | | Remarks |
|---|---|---|---|---|---|---|
| | | $H_2$ | $P_2(CH_3)_4$ | $(CH_3)_2PH$ | $(CH_3)_2PBH_2$ units (trimer +tetramer) | |
| 1 | Warmed —60° to —8° C., 10 hrs | 0.020 | 0.15 | | | |
| 2 | 20 min. at 100° | 0.020 | 0.136 | 0.056 | | $P_2(CH_3)_4$ returned. |
| 3 | 70 hrs. at 174° | 0.066 | 0.022 | 0.935 | 0.406 | All volatile components removed. |

Preferred utilities for the linear phosphinoborines of this invention include using them as dielectrics and as hydraulic fluids. They display excellent dielectric properties and hence are especially valuable as dielectrics 9. The structure of claim 2 wherein R' is methyl and R'' is methyl and dodecyl.

10. The structure of claim 2 wherein R' is methyl and R'' is ethyl and allyl.

11. The structure of claim 2 wherein R' and R" together represent a cyclotetramethylene radical bonded at either end thereof to the P.

12. The structure of claim 2 wherein Y is one of said amines.

13. The structure of claim 2 wherein Y is one of said phosphines.

14. The structure of claim 2 wherein at least one of said R groups is methyl.

15. The structure of claim 2 wherein at least one of said R groups is ethyl.

16. The structure of claim 2 wherein at least one of said symbols R' and R" is butyl.

17. A linear phosphinoborine polymer consisting essentially of a plurality of monomeric units, each of said units having the general formula (R'R"PBH$_2$), each of said units being linked to adjacent monomeric units by means of phosphorus-to-boron bonds, said polymer having intermediate the ends thereof a compound selected from the class consisting of a difunctional secondary amine, a difunctional tertiary amine, a difunctional secondary phosphine and a difunctional tertiary phosphine, each of said amines and phosphines containing only carbon and hydrogen in addition to the nitrogen and phosphorus atoms thereof, said intermediate compound being bonded at either end thereof to a boron atom of an adjacent monomeric unit, the symbols R' and R" being selected from the class consisting of (a) two separate radicals selected from the class consisting of alkyl groups having less than 13 carbon atoms, lower alkenyl and phenyl and (b) a single polymethylene radical bonded at either end thereof to the P.

18. A process for the preparation of a linear phosphinoborine polymer comprising: reacting diborane, a secondary phosphine and a third compound selected from the class consisting of a secondary amine, a tertiary amine, a tertiary phosphine, a difunctional secondary amine and a difunctional tertiary amine, each of said amines and phosphines containing only carbon and hydrogen in addition to the nitrogen and phosphorus atoms thereof, and pyrolyzing the reaction mixture so formed to produce said linear polymer, the said linear polymer consisting primarily of monomeric units, each of said units having the general formula (R'R"PBH$_2$), each of said units being linked to adjacent monomeric units by means of phosphorus-to-boron bonds, the symbols R' and R" being selected from the class consisting of (a) two separate radicals selected from the class consisting of alkyl groups having less than 13 carbon atoms, lower alkenyl and phenyl and (b) a single polymethylene radical bonded at either end thereof to the phosphorus, and recovering said linear polymer.

19. The process of claim 18 wherein said diborane and said secondary phosphine are first reacted to produce a phosphine borine.

20. A proces for the preparation of a linear phosphinoborine polymer comprising: pyrolyzing a phosphine borine of the general formula R'R"HP:BH$_3$ wherein R' and R" are selected from the class consisting of (a) two separate radicals selected from the class consisting of alkyl groups having less than 13 carbon atoms, lower alkenyl and phenyl and (b) a single polymethylene radical bonded at either end thereof to the P, with a member of the class consisting of secondary amines, tertiary amines, secondary phosphines, tertiary phosphines, difunctional secondary amines, difunctional tertiary amines, difunctional secondary phosphines and difunctional tertiary phosphines, each of said amines and phosphines containing only carbon and hydrogen in addition to the nitrogen and phosphorus atoms thereof, and recovering said linear polymer.

21. The process of claim 20 wherein pyrolysis is carried out at between about 180° and 200° C.

22. The process of claim 20 wherein the pyrolysis is carried out in a sealed chamber.

23. The process of claim 20 wherein R' and R" are methyl.

24. The process of claim 20 wherein R' is methyl and R" is ethyl.

25. The process of claim 20 wherein R' and R" are ethyl.

26. The process of claim 20 wherein R' is methyl and R" is propyl.

27. The process of claim 20 wherein R' is methyl and R" is dodecyl.

28. The process of claim 20 wherein R' is methyl and R" is phenyl.

29. The process of claim 20 wherein R' is methyl and R" is methyl and dodecyl.

30. The process of claim 20 wherein R' is methyl and R" is ethyl and allyl.

31. The process of claim 20 wherein R' and R" together represent a cyclotetramethylene radical bonded at either end thereof to the P.

32. The process of claim 20 wherein Y is one of said amines.

33. The process of claim 20 wherein Y is one of said phosphines.

34. The process of claim 20 wherein at least one of said R groups is methyl.

35. The process of claim 20 wherein at least one of said R groups is ethyl.

36. The process of claim 20 wherein at least one of said symbols R' and R" is butyl.

No references cited.